(12) United States Patent
Hsieh et al.

(10) Patent No.: US 7,615,603 B2
(45) Date of Patent: Nov. 10, 2009

(54) HOLE OR ELECTRON INJECTION POLYMERS AND PREPOLYMERS, HOLE OR ELECTRON TRANSPORT POLYMERS AND PREPOLYMERS, METHOD FOR FORMING THE SAME, AND THEIR APPLICATION

(75) Inventors: Kuo-Huang Hsieh, Taipei (TW); Man-Kit Leung, Taipei (TW); Chao-Hui Kuo, Taipei (TW); Li-Chung Kuo, Taipei (TW); Kuei-Hui Yang, Taipei (TW); Jiun-Haw Lee, Taipei (TW); Kang-Jyun Peng, Taipei (TW)

(73) Assignee: National Taiwan University, Taipei (TW)

( * ) Notice: Subject to any disclaimer, the term of this patent is extended or adjusted under 35 U.S.C. 154(b) by 542 days.

(21) Appl. No.: 11/289,290

(22) Filed: Nov. 30, 2005

(65) Prior Publication Data

US 2006/0115682 A1 Jun. 1, 2006

(30) Foreign Application Priority Data

Nov. 30, 2004 (TW) ............................... 93136937 A

(51) Int. Cl.
*C08G 18/00* (2006.01)
*C08G 18/06* (2006.01)
*B32B 19/00* (2006.01)

(52) U.S. Cl. ..................... 528/44; 528/422; 528/423; 428/411.1; 428/423.1; 428/690; 428/917; 427/372.2

(58) Field of Classification Search ............... 528/423, 528/44, 422; 428/411.1, 423.1, 690, 917; 427/372.2

See application file for complete search history.

(56) References Cited

U.S. PATENT DOCUMENTS 6,703,780 B2 * 3/2004 Shiang et al. ............... 313/504
6,777,871 B2 * 8/2004 Duggal et al. ............... 313/506

OTHER PUBLICATIONS

Chao-Hui Kuo, Kang-Chun Peng, Li-Chung Kuo, Kuei-Hui Yang Jiun-Haw Lee, Man-Kit Leung, and Kuo-Kuang Hsieh; High-Performance Hole-Transport Polyurethanes for Light-Emitting Diodes Applications; Chem. Mater. 2006, vol. 18, No. 17, pp. 4121-4129; 2006 American Chemical Society; Published on Web Jul. 15, 2006.

(Continued)

*Primary Examiner*—Duc Truong
(74) *Attorney, Agent, or Firm*—WPAT, PC; Justin King

(57) ABSTRACT

The present invention discloses hole or electron injection polymers and prepolymers, hole or electron transport polymers and prepolymers, which comprises a plurality of conjugated or non-conjugated structures with electronic function and a plurality of connecting structures, wherein the connecting structure is used to connect different conjugated or non-conjugated structures with electronic function, and the connecting structure comprises any one or any combination of the following group: ether based group, ester based group, urethane based group, urea based group, carbonate based group, nitrogen atom based group, amide based group, and imide based group. Moreover, this invention also discloses a method for forming the mentioned charge injection or transport polymers and prepolymers. Additionally, this invention provides hole injection layer or hole transport layer or electron injection layer or electron transport layer comprising copolymers with a first structure unit with hole injecting/transporting property and a second structure unit with electron injecting/transporting property.

6 Claims, 1 Drawing Sheet

OTHER PUBLICATIONS

Kun-Rung Lin, Chao-Hui Kuo, Li-Chung Kuo, Kuei-Hui Yang, Man-Kit Leung, and Kuo-Huang Hsieh; New hole-transport polyurethanes applied to polymer light-emitting diodes; Elsevier, Science Direct, European Polymer Journal 43 (2007), pp. 4279-4288; www.elsevier.com/locate/europolj.

* cited by examiner

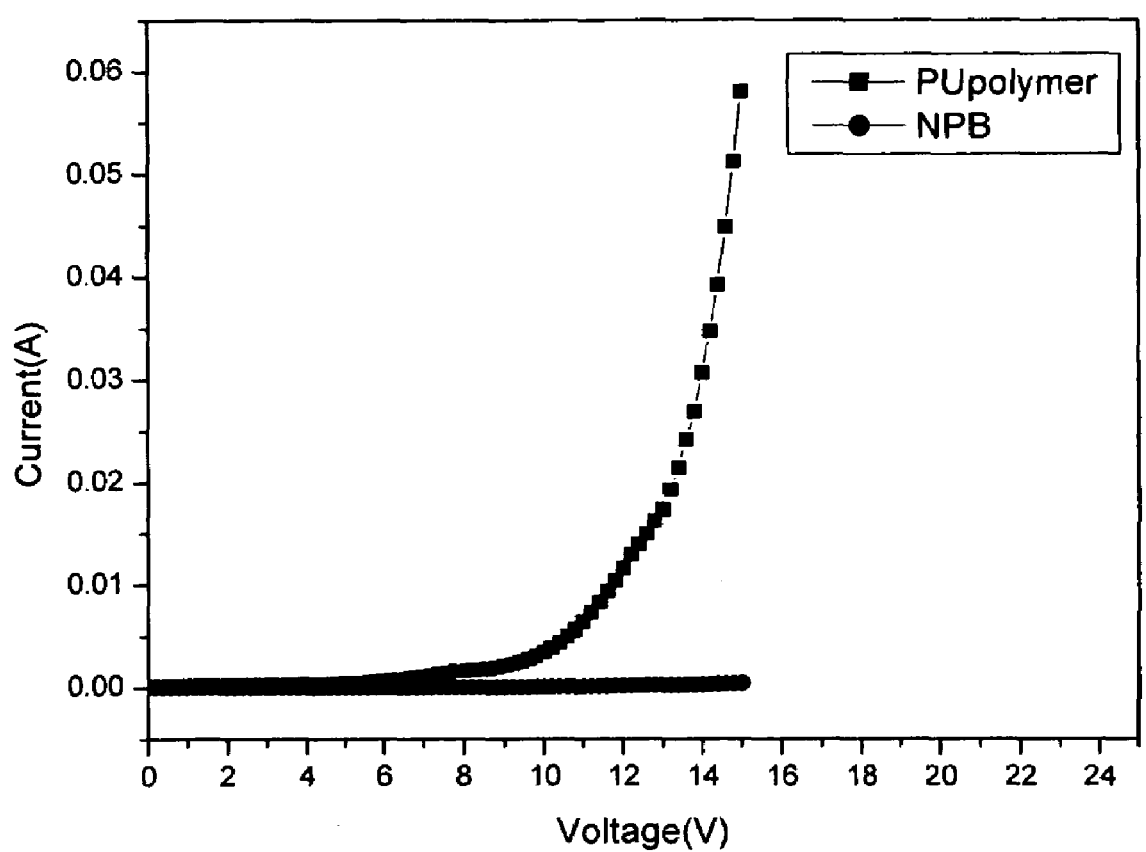

HOLE OR ELECTRON INJECTION POLYMERS AND PREPOLYMERS, HOLE OR ELECTRON TRANSPORT POLYMERS AND PREPOLYMERS, METHOD FOR FORMING THE SAME, AND THEIR APPLICATION

BACKGROUND OF THE INVENTION

1. Field of the Invention

The present invention is generally related to charge injection and transport materials, and more particularly to hole or electron injection polymers and prepolymers, hole or electron transport polymers and prepolymers, method for forming the same, and their application in organic electronic materials and organic optoelectronic materials.

2. Description of the Prior Art

The working principle of organic light emitting diodes (OLEDs) or polymer light emitting diodes (PLEDs) is that the holes and the electrons which are injected from the anode and cathodes respectively. The holes will inject into the Highest Occupied Molecular Orbital (HOMO) of the hole transport layer, and electrons will inject into the Lowest Unoccupied Molecular Orbital (LUMO) of the electron transport layer. With the voltage difference across the OLED or PLED, the holes and electrons are able to migrate in the organic layers. Finally, electrons and holes recombine on the same polymer chain or molecule to form electron-hole pairs in the emitting layer, so that light emission can occur.

The most frequently used small hole transport molecules, such as N,N'-di-m-tolyl-N,N'-diphenyl-1,1'-biphenyl-4,4'-diamine (TPD) and 4,4'-bis[N-(1-naphthyl)-N-phenylamino]biphenyl (NPB) have been proved to be excellent hole-transport materials and have shown a wide range of practical applications. These classes of materials offer many attractive properties such as high charge carrier mobility and ease of sublimation. However, they possess some disadvantages for use in long-lifetime OLED devices such as their relatively low glass transition temperature (Tg~65° C. for TPD and Tg~100° C. for NPB), ease of crystallization and unsatisfactory morphological stability.

Although polymeric charge transport materials can overcome the mentioned problems of small molecules, but fabrication of polymeric multi-layer structures is somewhat hard because typical solvents such as chloroform, dichloroethane, toluene or xylene would dissolve most electroluminescent (EL) polymers. Consequently, fabrication of multi-layer EL devices through layer-by-layer spin coating or inkjet printing would be difficult.

Therefore, new charge injection or transport materials are still needed corresponding to increasing thermal stability, decreasing injection barrier between charge transport layer and electrodes, providing easy fabrication method without dissolving the electroluminescent (EL) materials, and moreover, to improve the efficiency of organic electronic/optoelectronic devices.

SUMMARY OF THE INVENTION

In accordance with the present invention, new hole or electron injection polymers and prepolymers, hole or electron transport polymers and prepolymers (hereinafter as "charge injection or transport polymers and prepolymers") are provided that substantially overcomes the drawbacks of the above problems mentioned from the conventional system.

One object of the present invention is to provide charge injection or transport polymers and prepolymers with polar group(s). Since many famous light-emitting polymers in literature such as MEHPPV, super-yellow, or polyfluorenes are soluble in non-polar solvents, charge injection or transport materials that are soluble in polar aprotic solvents, such as DMF, or NMP, are appropriate in the fabrication of light emitting diodes, or even other organic electronic/optoelectronic devices.

Another object of the present invention is to provide hole injection layer or hole transport layer or electron injection layer or electron transport layer comprising a copolymer with a first structure unit with hole injecting/transporting property and a second structure unit with electron injecting/transporting property. By adjusting the relative fraction between the first structure unit and the second structure unit, users can simply and directly fabricate LEDs with different turn-on voltage. Therefore, this present invention does have the economic advantages for industrial applications.

Accordingly, the present invention discloses hole or electron injection polymers and prepolymers, hole or electron transport polymers and prepolymers, which comprises a plurality of conjugated or non-conjugated structures with electronic function and a plurality of connecting structures, wherein the connecting structure is used to connect different conjugated or non-conjugated structures with electronic function, and the connecting structure comprises any one or any combination of the following group: ether based group, ester based group, urethane based group, urea based group, carbonate based group, nitrogen atom based group, amide based group, and imide based group. Moreover, this invention also discloses a method for forming the mentioned charge injection or transport polymers and prepolymers. Additionally, this invention provides hole injection layer or hole transport layer or electron injection layer or electron transport layer comprising copolymers with a first structure unit with hole injecting/transporting property and a second structure unit with electron injecting/transporting property.

BRIEF DESCRIPTION OF THE DRAWINGS

The FIGURE shows Hole-only experiments for PU copolymer and α-NPB.

DESCRIPTION OF THE PREFERRED EMBODIMENTS

What probed into the invention are hole or electron injection polymers and prepolymers, hole or electron transport polymers and prepolymers, method for forming the same, and their application. Detailed descriptions of the production, structure and elements will be provided in the following in order to make the invention thoroughly understood. Obviously, the application of the invention is not confined to specific details familiar to those who are skilled in the art. On the other hand, the common elements and procedures that are known to everyone are not described in details to avoid unnecessary limits of the invention. Some preferred embodiments of the present invention will now be described in greater detail in the following. However, it should be recognized that the present invention can be practiced in a wide range of other embodiments besides those explicitly described, that is, this invention can also be applied extensively to other embodiments, and the scope of the present invention is expressly not limited except as specified in the accompanying claims.

DEFINITION

The term "polymer" and "prepolymer" herein refer to a polymer chain comprises at least two structure units.

The term "electronic/optoelectronic" herein refer to electronic and/or optoelectronic.

The term "injecting/transporting" herein refer to injecting and/or transporting.

In a first embodiment of the present invention, a hole or electron injection polymer and prepolymer, or a hole or electron transport polymer and prepolymer is disclosed. The hole or electron injection polymer and prepolymer, or a hole or electron transport polymer and prepolymer comprises a plurality of conjugated or non-conjugated structures with electronic function and a plurality of connecting structures, wherein the connecting structure is used to connect different conjugated or non-conjugated structures, and the connecting structure comprises any one or any combination of the following group: ether based group, ester based group, urethane based group, urea based group, carbonate based group, nitrogen atom based group, amide based group, and imide based group. Additionally, the mentioned material can be used in hole injection layer or hole transport layer or electron injection layer or electron transport layer of organic electronic/optoelectronic devices, such as: light emitting diodes.

In this embodiment, the structure formula of the mentioned conjugated or non-conjugated structure comprises one selected from the group consisting of

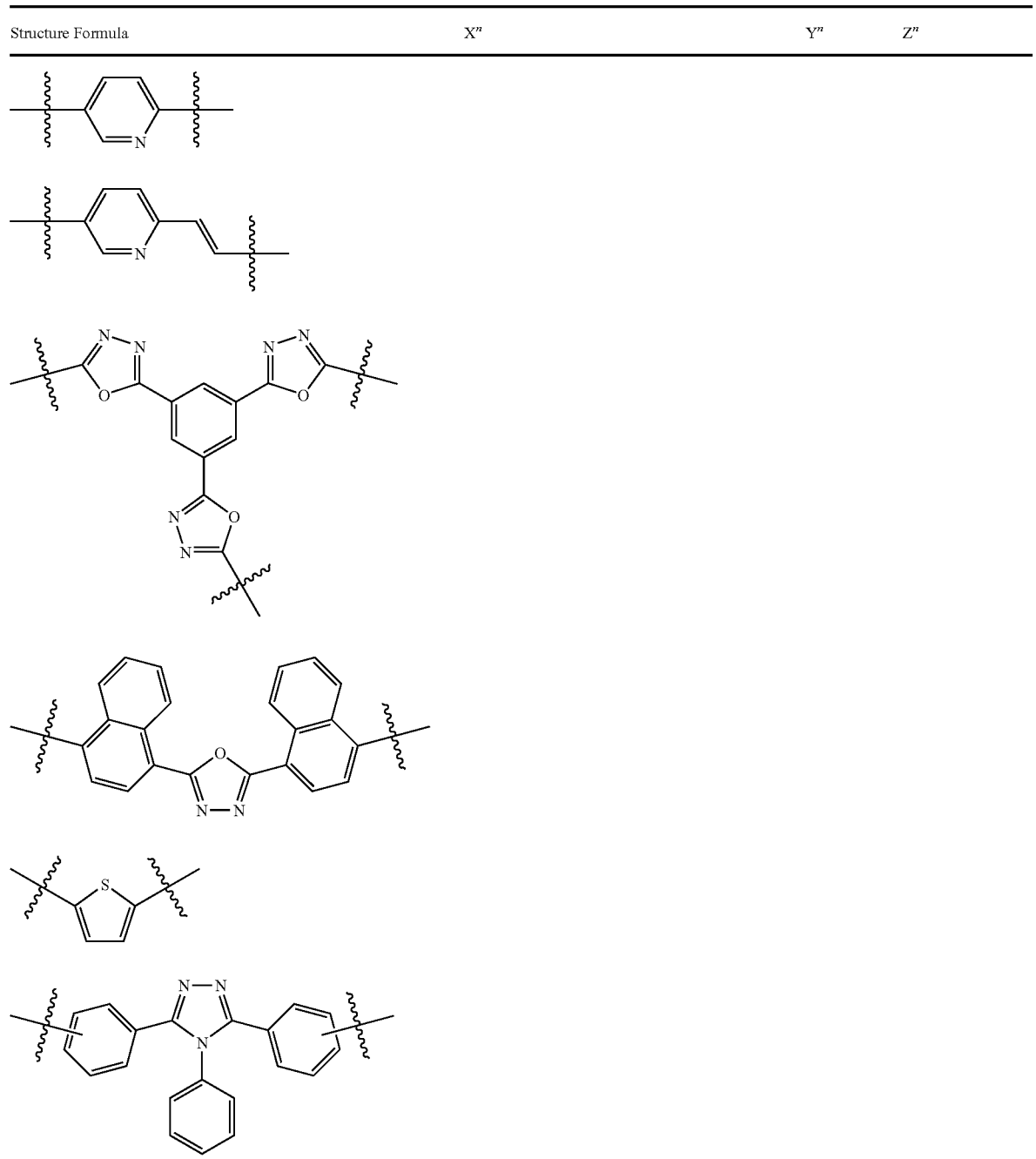

-continued

| Structure Formula | X$^n$ | Y$^n$ | Z$^n$ |
|---|---|---|---|

-continued

| Structure Formula | $X^n$ | $Y^n$ | $Z^n$ |
|---|---|---|---|
| (triazine with two phenyl substituents, $X^2$) | $X^2$ = phenyl; $X^2$ = pyridyl; $X^2$ = naphthyl; $X^2$ = quinolinyl | | |
| (benzobisthiazole with $X^3$ linker) | $X^3$ = phenylene; $X^3$ = naphthylene; $X^3$ = butadienyl | | |
| (anthracene with $S^1$, $S^2$ substituents) | | | |
| (naphthalene linker) | | | |
| (six-membered ring with $X^4$ and $S^1$) | $X^4$ = $CR_2$; NR; PR: O; S | | |

-continued

| Structure Formula | $X^n$ | $Y^n$ | $Z^n$ |
|---|---|---|---|
| | | | |
| | | | |
| | | | |
| | $X^5 = CR_2$; NR; PR; O; S | | |
| | | | |
| | | | |
| | | | |
| | $X^6 = SiR_2$; NR; O; S | | |
| | $X^7 = CH$; N | $Y^7 = CN$; H | |

-continued

| Structure Formula | $X^n$ | $Y^n$ | $Z^n$ |
|---|---|---|---|
| | | | |
| | | | |
| | | | |
| | $X^8 = CR_2$; NR; PR | | |
| | | | |
| | | | |
| | | | |

-continued

| Structure Formula | $X^n$ | $Y^n$ | $Z^n$ |
|---|---|---|---|
| (pyrene with S¹, S²) | | | |
| (thiophene) | | | |
| (phenylene-vinylene with S¹, S²) | | | |
| (fluorene-type with X⁹, Y⁹, S¹, S²) | $X^9 =$ (thiophene); $X^9 =$ (bithiophene); $X^9 =$ (dimethylthiophene); $X^9 =$ (EDOT-type thiophene with dioxine); $X^9 =$ (divinyl-phenylene with S¹, S²); $X^9 =$ (phenylene) | $Y^9 = O; NR;$ $S; SiR_2; PR$ $Y^9 = O; NR;$ $S; SiR_2; PR$ $Y^9 = O; NR;$ $S; SiR_2; PR$ $Y^9 = O; NR;$ $S; SiR_2; PR$ $Y^9 = O; NR;$ $S; SiR_2; PR$ $Y^9 = O; NR;$ $S; SiR_2; PR$ | |
| (biphenyl with S¹, S²) | | | |

-continued

| Structure Formula | $X^n$ | $Y^n$ | $Z^n$ |
|---|---|---|---|
| 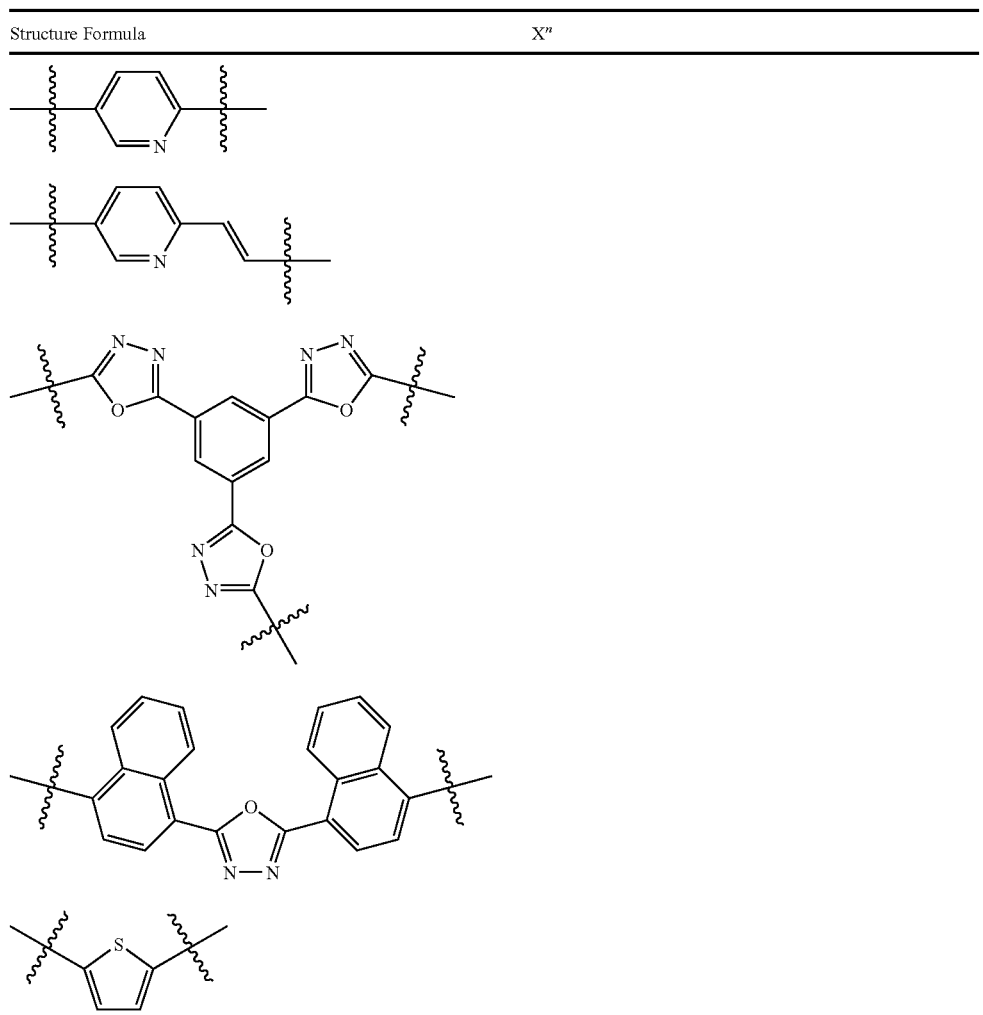 | | | |
| | $X^{10} = CS^1$; N | $Y^{10} = CS^1$; N | $Z^{10} = $ —O—; —S—; —NS$^1$—; —CS$^1$S$^2$—; —CS$^1$=CS$^1$—; —CS$^1$=N— | and the combination thereof, wherein two of the $S^1, S^2, S^3, S^4$ are identical or non-identical, and wherein the R, $S^1, S^2, S^3, S^4$ comprise one selected from the group consisting of a hydrogen atom, alkyl group, alkoxy group, cyclic alkyl group, aromatic group, heterocyclic group and the combination thereof.

In a preferred example of this embodiment, electron injection polymer and prepolymer or an electron transport polymer and prepolymer are provided with some specific conjugated or non-conjugated structures, and the structure formula of the conjugated or non-conjugated structure comprises one selected from the group consisting of

| Structure Formula | $X^n$ |
|---|---|
| 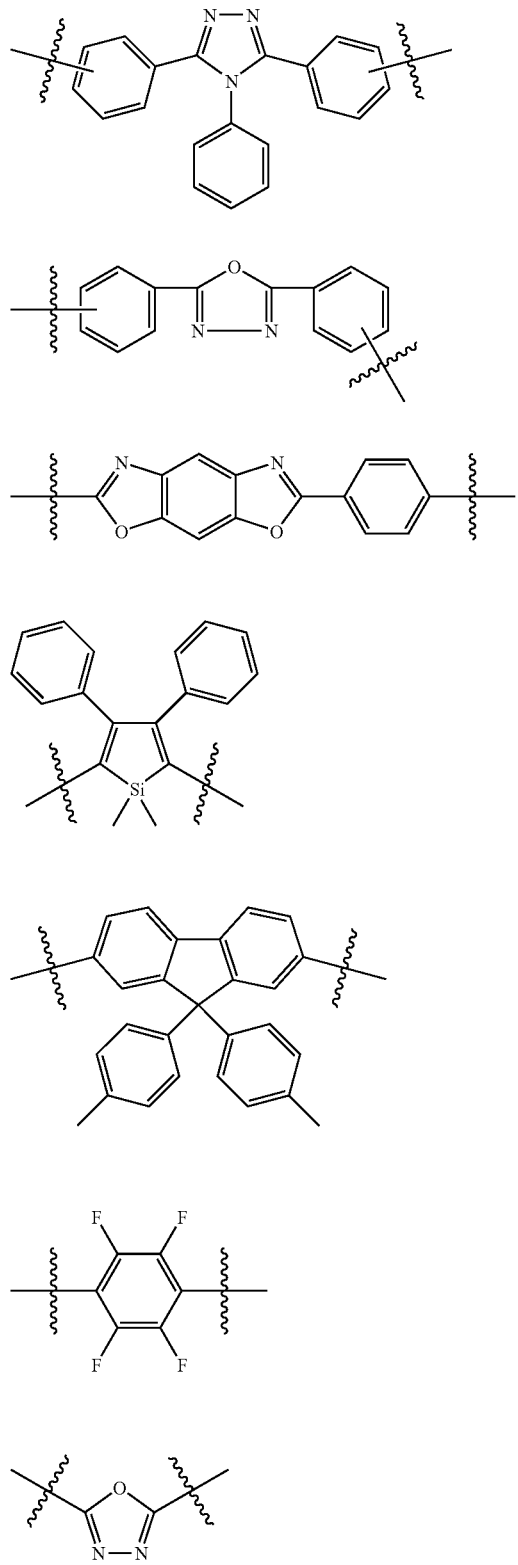 | |

-continued

| Structure Formula | $X^n$ |
|---|---|

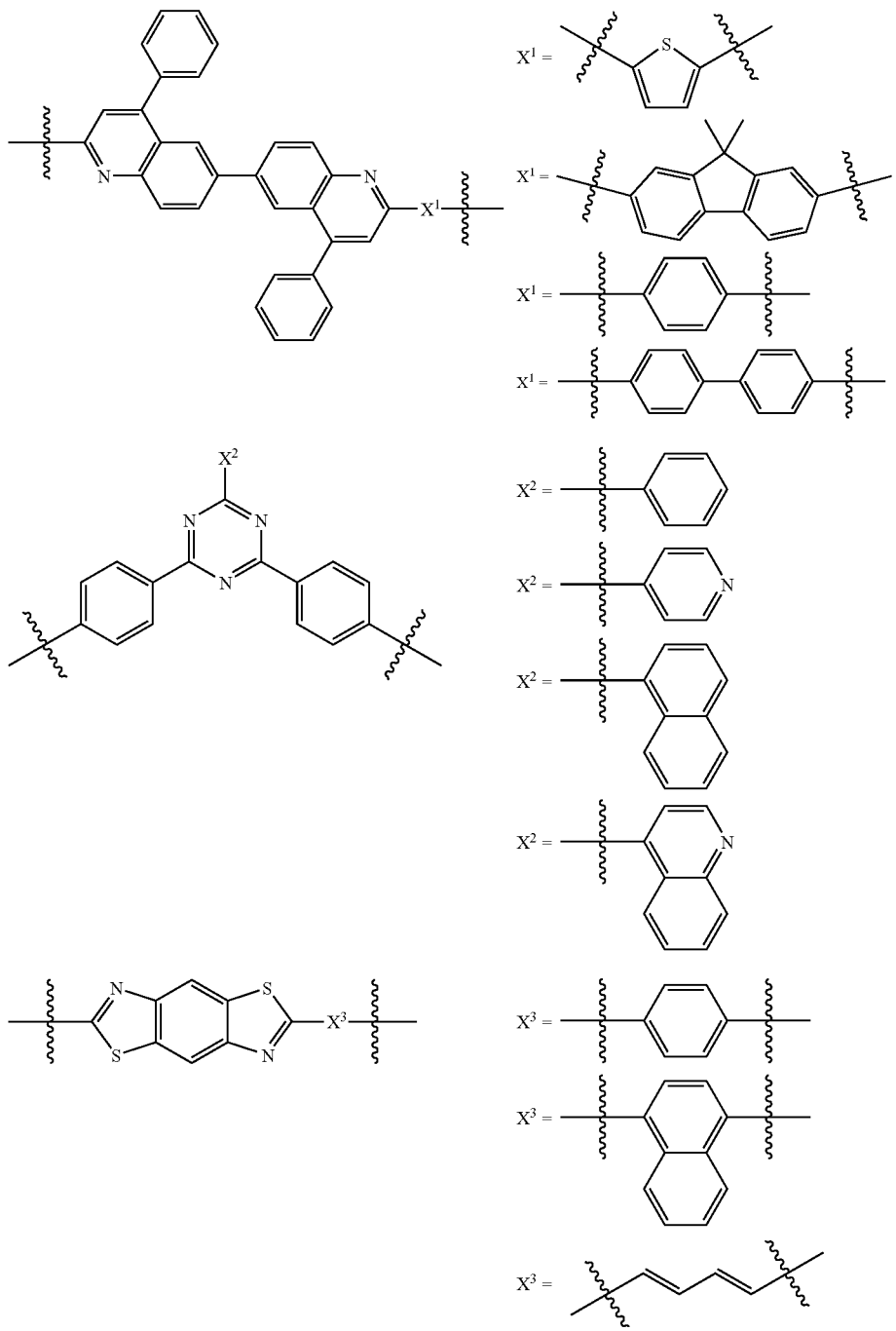

In this embodiment, the hole or electron injection polymer and prepolymer, or a hole or electron transport polymer and prepolymer further comprises a plurality of active structures, wherein the connecting structure is used to connect the active structure to the conjugated or non-conjugated structure, and the active structure comprises any one or any combination of the following group: tert-butyl group, carbon-carbon multiple bond, epoxy group, sulfonic group, hydroxyl group, amine group, carboxylic acid group, isocyanate group, organic halide group, acyl halide group and aldehyde group. The mentioned active structures are used for layer-layer connecting procedures, such as: connecting to emitting layers, connecting to electrodes, connecting to hole injecting layers and connecting to electron injecting layers, so as to increase the adhesive property between layers.

In a second embodiment of the present invention, a charge injection or transport polymer and prepolymer is disclosed. First, a first monomer with electronic function and a second monomer with at least two isocyanate groups are provided, wherein the first monomer has at least one conjugated or non-conjugated structure and at least two hydroxyl groups or at least two amine groups. Then, the first monomer and the second monomer are polymerized to form a first charge injection or transport polymer and prepolymer. The polymerization is catalyzed by homogeneous catalysts or heterogeneous catalysts.

In this embodiment, after the polymerization, the method further comprises a termination reaction by a terminator containing a binding group to react with the residual hydroxyl group, residual amine group or residual isocyanate group, so as to form a second second charge injection or transport polymer and prepolymer. When the molar ratio of residual isocyanate group to residual hydroxyl/amine group is more than 1, the binding group of the terminator is isocyanate group. On the contrary, when the molar ratio of residual isocyanate group to residual hydroxyl/amine group is less than 1, the binding group of the terminator is hydroxyl group and/or amine group.

Additionally, the terminator can further comprise at least one active group, and the active group comprises one of the group consisting of: tert-butyl group, carbon-carbon multiple bond, epoxy group, sulfonic group, hydroxyl group, amine group, carboxylic acid group, isocyanate group, organic halide group, acyl halide group and aldehyde group. The mentioned active structures are used for layer-layer connecting procedures, such as: connecting to emitting layers, connecting to electrodes, connecting to hole injecting layers and connecting to electron injecting layers, so as to increase the adhesive property between layers. Moreover, some preferred examples of the terminator are listed as follows:

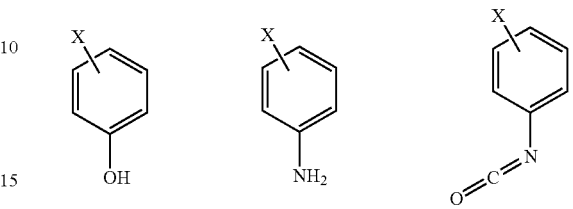

, wherein X comprises one selected from the group consisting of: tert-butyl group, carbon-carbon multiple bond, epoxy group, sulfonic group, hydroxyl group, amine group, carboxylic acid group, isocyanate group, organic halide group, acyl halide group and aldehyde group.

In this embodiment, the general formula of the first monomer is HO-G-OH or $H_2N$-G-$NH_2$, and the structure formula of G comprise one of the group consisting of

| Structure Formula | $X^n$ | $Y^n$ | $Z^n$ |
|---|---|---|---|

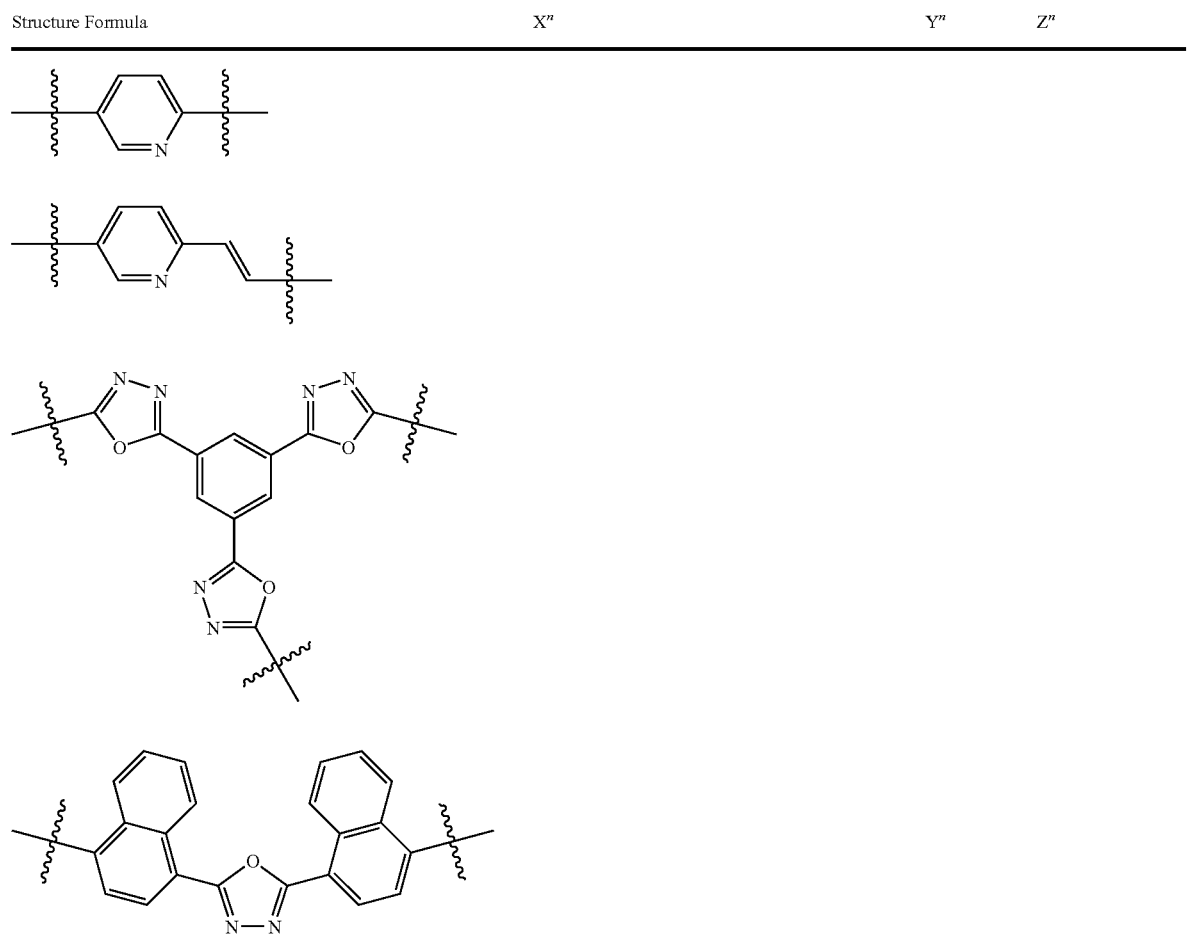

-continued

| Structure Formula | $X^n$ | $Y^n$ | $Z^n$ |
|---|---|---|---|

-continued

| Structure Formula | $X^n$ | $Y^n$ | $Z^n$ |
|---|---|---|---|

-continued

| Structure Formula | $X^n$ | $Y^n$ | $Z^n$ |
|---|---|---|---|
| | | | |
| | $X^4 = CR_2$; NR; PR; O; S | | |
| | | | |
| | | | |
| | | | |
| | $X^5 = CR_2$; NR; PR; O; S | | |
| | | | |
| | | | |
| | | | |

-continued

| Structure Formula | $X^n$ | $Y^n$ | $Z^n$ |
|---|---|---|---|

$X^6$ = SiR$_2$; NR; O; S $X^7$ = CH; N $\qquad$ $Y^7$ = CN; H $X^8$ = CR$_2$; NR; PR -continued
| Structure Formula | $X^n$ | $Y^n$ | $Z^n$ |
|---|---|---|---|
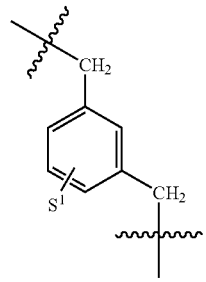
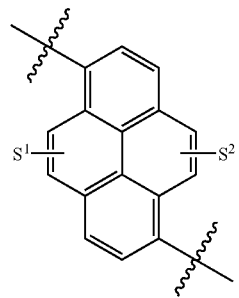
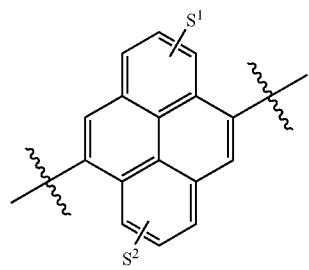
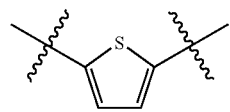
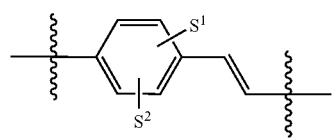

-continued

| Structure Formula | $X^n$ | $Y^n$ | $Z^n$ |
|---|---|---|---|
| [fluorene structure with $Y^9$, $S^1$, $S^2$, linked via $X^9$] | $X^9 =$ [thiophene] | $Y^9 =$ O; NR; S; SiR$_2$; PR | |
| | $X^9 =$ [bithiophene] | $Y^9 =$ O; NR; S; SiR$_2$; PR $Y^9 =$ O; NR; S; SiR$_2$; PR | |
| | $X^9 =$ [dimethylthiophene] | $Y^9 =$ O;NR; S; SiR$_2$; PR $Y^9 =$ O; NR; S; SiR$_2$; PR | |
| | $X^9 =$ [EDOT structure] | $Y^9 =$ O; NR; S; SiR$_2$; PR | |
| | $X^9 =$ [divinyl phenylene with $S^1$, $S^2$] | | |
| | $X^9 =$ [phenylene] | | |
| [biphenyl with $S^1$, $S^2$] | | | |
| [distyrylbenzene with $S_1$, $S_2$] | | | |
| [$X^{10}$—$Y^{10}$ / $Z^{10}$ five-membered ring] | $X^{10} =$ CS$^1$; N | $Y^{10} =$ CS$^1$; N | $Z^{10} =$ —O—; —S—; —NS$^1$—; —CS$^1$S$^2$—; —CS$^1$=CS$^1$—; —CS$^1$=N— | and the combination thereof, wherein two of the S$^1$, S$^2$, S$^3$, S$^4$ are identical or non-identical, and wherein the R, S$^1$, S$^2$, S$^3$, S$^4$ comprise one selected from the group consisting of a hydrogen atom, alkyl group, alkoxy group, cyclic alkyl group, aromatic group, heterocyclic group and the combination thereof.

In this embodiment, the second monomer comprises any one or any combination of the following group:

(1) aromatic polyisocyanates: tolylene diisocyanate (TDI) (2,4- or 2,6-TDI), diphenylmethane diisocyanate (MDI) (4,4'- or 2,4'-MDI), polymeric MDI, xylylene diisocyanate (XDI), naphthylene diisocyanate (NDI) (usually 1,5-NDI), paraphenylene diisocyanate (PPDI), tetramethylxylylene diisocyanate (TMXDI), tolidine diisocyanate (TODI), 3,3'-dimethoxy-4,4'-biphenylene diisocyanate (2) alicyclic polyisocyanates: dicyclohexylmethane diisocyanate (HMDI) (4,4'- or 2,4'-HMDI), isophorone diisocyanate (IPDI), isopropylidene-bis-(4-cyclohexylisocyanate) (IPC), hydrogenated xylylene diisocyanate (hydrogenated XDI), cyclohexylene diisocyanate (CHPI) (usually 1,4-CHPI), 1,5-tetrahydonaphthalene diisocyanate (3) aliphatic polyisocyanates: hexamethylene diisocyanate (HDI), lysine diisocyanate (LDI), tetramethylene diisocyanate (4) trimethylbenzyl triisocyanate, triisothiocyanate, benzyl triiso(thio)cyanate, triphenylmethane-4,4',4"-triisocyanate, 1,2,4-benzene triisocyanate, triphenyl triisocyanate, benzene triisocyanate, toluene triisocyanate, 1,3,5-cyclohexane triisocyanate, lysine ester triisocyanate, hexamethylene 1,3,6-trisisocyanate, bicycloheptane triisocyanate, biuret triisocyanate In a third embodiment of the present invention, a hole injection layer or hole transport layer is disclosed, wherein the hole injection layer or hole transport layer comprises a copolymer with a plurality of first structure unit with hole injecting/transporting property, a plurality of second structure unit with electron injecting/transporting property and a plurality of connecting structures. The molar ratio of the first structure unit to the second structure unit is equal to or more than 1. Furthermore, the connecting structure is used to connect at least two of the structure units, which means to connect at least two of the first structure units and/or to connect at least two of the second structure units and/or to connect at least one of the first structure unit with at least one of the second structure unit. In addition, the mentioned connecting structure comprises any one or any combination of the following group: ether based group, ester based group, urethane based group, urea based group, carbonate based group, nitrogen atom based group, amide based group, and imide based group.

In this embodiment, the structure formula of the first structure unit and the second structure unit comprises one selected from the group consisting of

| Structure Formula | $X^n$ | $Y^n$ | $Z^n$ |
|---|---|---|---|

-continued

| Structure Formula | X$^n$ | Y$^n$ | Z$^n$ |
|---|---|---|---|

-continued
| Structure Formula | $X^n$ | $Y^n$ | $Z^n$ |
|---|---|---|---|
| 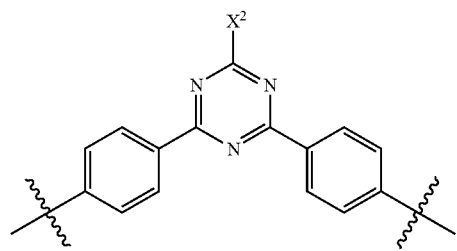 | $X^2 =$ 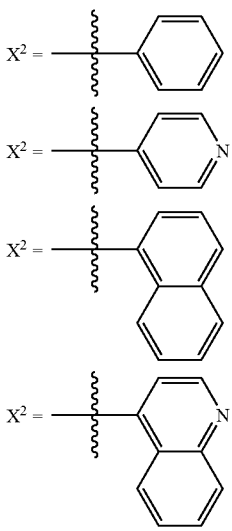 | | |
| 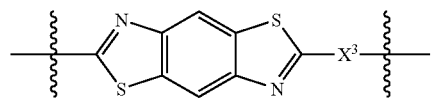 | 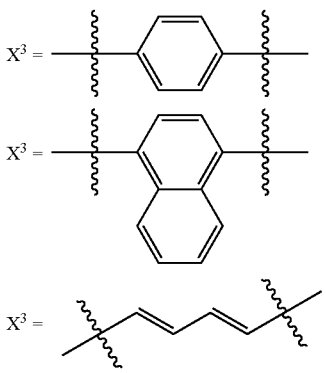 | | |
| 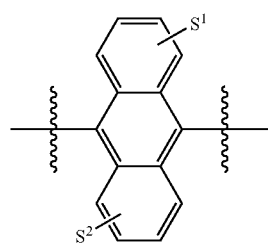 | | | |
| 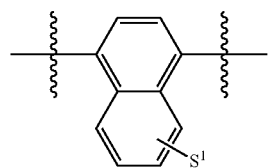 | | | |
| 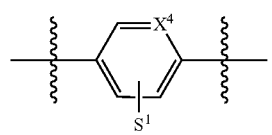 | $X^4 = CR_2; NR; PR; O; S$ | | |

-continued

| Structure Formula | $X^n$ | $Y^n$ | $Z^n$ |
|---|---|---|---|
| [structure] | | | |
| [structure] | | | |
| [structure] | | | |
| [structure] | $X^5 = CR_2$; NR; PR; O; S | | |
| [structure] | | | |
| [structure] | | | |
| [structure] | | | |
| [structure] | $X^6 = SiR_2$; NR; O; S | | |
| [structure] | $X^7 = CH$; N | $Y^7 = CN$; H | |

| Structure Formula | $X^n$ | $Y^n$ | $Z^n$ |
|---|---|---|---|
| (phenyl–C≡C–phenyl linker) | | | |
| (S¹-substituted phenyl linker) | | | |
| (S¹,S²-substituted naphthalene linker) | | | |
| (bis-phenyl linker bridged by $X^8$) | $X^8 = CR_2$; NR; PR | | |
| (CH₂–phenyl(S¹)–CH₂ linker) | | | |
| (S¹,S²-substituted pyrene linker) | | | |

-continued
| Structure Formula | $X^n$ | $Y^n$ | $Z^n$ |
|---|---|---|---|
| 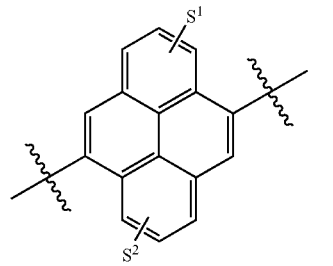 | | | |
| 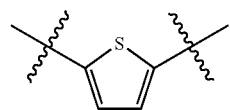 | | | |
| 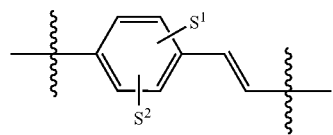 | | | |
| 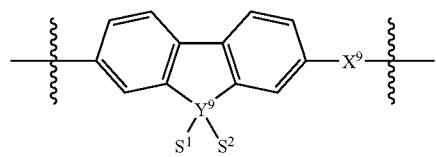 | $X^9 =$ 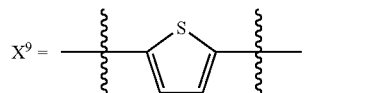 <br> $X^9 =$ 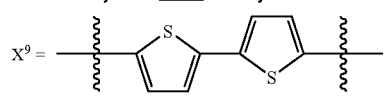 <br> $X^9 =$ 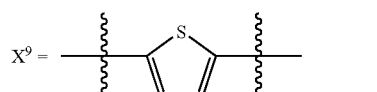 <br> $X^9 =$ 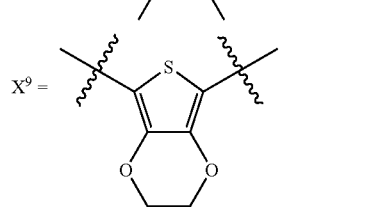 <br> $X^9 =$ 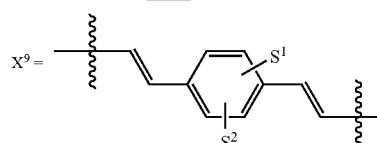 <br> $X^9 =$ 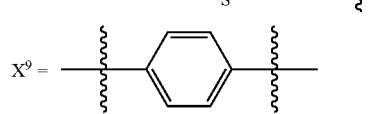 | $Y^9$ = O; NR; S; SiR$_2$; PR <br> $Y^9$ = O; NR; S; SiR$_2$; PR <br> $Y^9$ = O; NR; S; SiR$_2$; PR <br> $Y^9$ = O; NR; S; SiR$_2$; PR <br> $Y^9$ = O; NR; S; SiR$_2$; PR <br> $Y^9$ = O; NR; S; SiR$_2$; PR | |
| 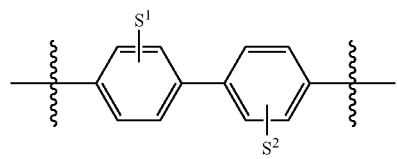 | | | |

-continued

| Structure Formula | $X^n$ | $Y^n$ | $Z^n$ |
|---|---|---|---|
| [structure with S₁, S₂ stilbene-type] | | | |
| [X¹⁰—Y¹⁰ / Z¹⁰ ring] | $X^{10} = CS^1$; N | $Y^{10} = CS^1$; N | $Z^{10} = $ —O—; —S—; —NS¹—; —CS¹S²—; —CS¹=CS¹—; —CS¹=N— | and the combination thereof, wherein two of the $S^1, S^2, S^3, S^4$ are identical or non-identical, and wherein the R, $S^1, S^2, S^3, S^4$ comprise one selected from the group consisting of a hydrogen atom, alkyl group, alkoxy group, cyclic alkyl group, aromatic group, heterocyclic group and the combination thereof.

In a preferred example of this embodiment, the structure formula of the second structure unit comprises one selected from the group consisting of

| Structure Formula | $X^n$ |
|---|---|
| [pyridine] | |
| [pyridine-vinyl] | |
| [bis-oxadiazole benzene with third oxadiazole] | |
| [bis-naphthyl oxadiazole] | |

| Structure Formula | X$^n$ |
|---|---|

-continued
| Structure Formula | $X^n$ |
|---|---|
| 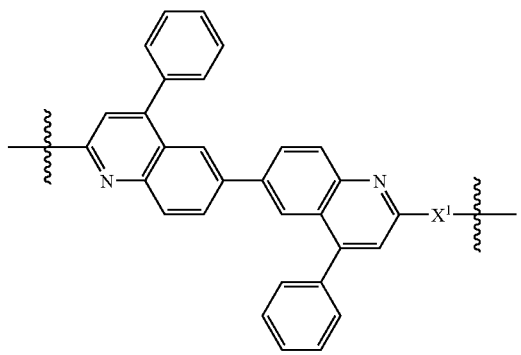 | 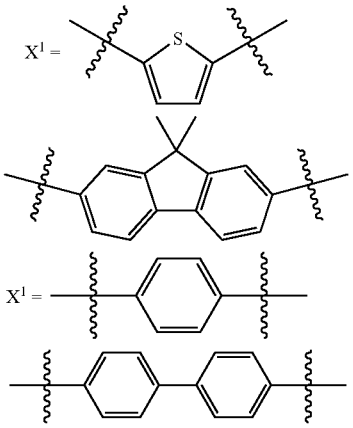 |
| 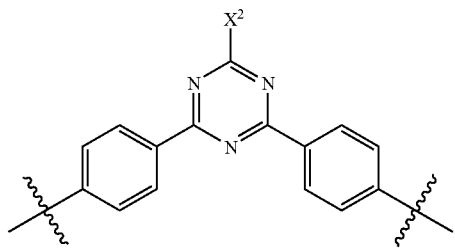 | 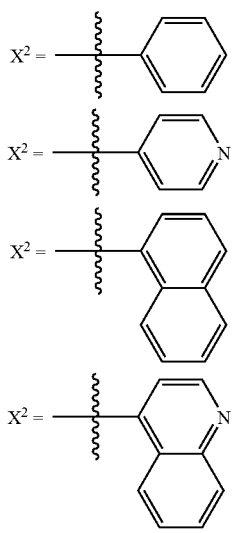 |
| 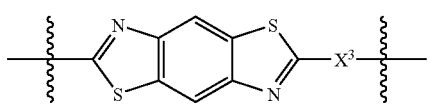 | 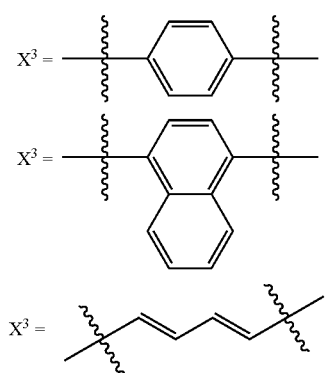 |

Additionally, the preferred molar ratio of the first structure unit to the second structure unit ranges from 2 to 20. Moreover, the mentioned further comprises a active structure, wherein the active structure connects to the connecting structure, and the active structure comprises any one or any combination of the following group: tert-butyl group, carbon-carbon multiple bond, epoxy group, sulfonic group, hydroxyl group, amine group, carboxylic acid group, isocyanate group, organic halide group, acyl halide group and aldehyde group.

Example

Hole Injection and Transport Properties of PU Copolymer

In this example, the hole injection layer or hole transport layer comprises the connecting structure of urethane based group (hereinafter as PU copolymer). The hole-injection and transport properties of the PU copolymer were evaluated by a hole-only approach. In the study, poly-(3,4-ethylenedioxythiophene)-polystyrene sulfonates (PEDOT-PSS),N,N'-diphenyl-N,N'-bis(1-napthyl)-1,1'-biphenyl-4,4'-diamine (α-NPB) and silver (Ag) are used as the hole-injection and electron-blocking and the cathode materials, respectively. The device structure, ITO/PEDOT-PSS(20 nm)/PU copolymer(30 nm)/α-NPB(70 nm)/Ag(100 nm), as adapted in which only the hole current is expected. A large barrier for the electron injection process from Ag to α-NPB is anticipated to inhibit the electron current through the device. The J-V curves for the devices are shown in FIG. 1. The hole current was greatly enhanced when the PU copolymer layer was applied. These results reflected that the PU copolymer were extremely good hole-injection materials. The current of the device with PU copolymer could reach to 100 mA/cm$^2$ at 12.1 V. In contrast, for the control α-NPB (100 nm) hole-only device, the current could only reach to 1.6 mA/cm$^2$ at 13 V.

In a fourth embodiment of the present invention, an electron injection layer or electron transport layer is disclosed, wherein the electron injection layer or electron transport layer comprises a copolymer with a plurality of first structure unit with hole injecting/transporting property, a plurality of second structure unit with electron injecting/transporting property and a plurality of connecting structures, wherein the molar ratio of the second structure unit to the first structure unit is equal to or more than 1, and 2 to 20 is more preferred. Furthermore, the connecting structure is used to connect at least two of the structure units, which means to connect at least two of the first structure units and/or to connect at least two of the second structure units and/or to connect at least one of the first structure unit with at least one of the second structure unit. Moreover, the copolymer further comprises an active structure, wherein the active structure connects to the connecting structure. In addition, the selection of the first structure unit, the second structure unit, the connecting structure, and the active structure are as described in the third embodiment.

In the above preferred embodiments, the present invention provides charge injection or transport polymers and prepolymers with polar group(s). Since many famous light-emitting polymers in literature such as MEHPPV, super-yellow, or polyfluorenes are soluble in non-polar solvents, charge injection or transport materials that are soluble in polar aprotic solvents, such as DMF, or NMP, are appropriate in the fabrication of light emitting diodes, or even other organic electronic/optoelectronic devices. Furthermore, this invention provides provide hole injection layer or hole transport layer or electron injection layer or electron transport layer comprising copolymers with a first structure unit with hole injecting/transporting property and a second structure unit with electron injecting/transporting property. By adjusting the relative fraction between the first structure unit and the second structure unit, users can simply and directly fabricate LEDs with different turn-on voltage. Therefore, this present invention does have the economic advantages for industrial applications.

To sum up, the present invention discloses hole or electron injection polymers and prepolymers, hole or electron transport polymers and prepolymers, which comprises a plurality of conjugated or non-conjugated structures with electronic function and a plurality of connecting structures, wherein the connecting structure is used to connect different conjugated or non-conjugated structures with electronic function, and the connecting structure comprises any one or any combination of the following group: ether based group, ester based group, urethane based group, urea based group, carbonate based group, nitrogen atom based group, amide based group, and imide based group. Moreover, this invention also discloses a method for forming the mentioned charge injection or transport polymers and prepolymers. Additionally, this invention provides hole injection layer or hole transport layer or electron injection layer or electron transport layer comprising copolymers with a first structure unit with hole injecting/transporting property and a second structure unit with electron injecting/transporting property.

Obviously many modifications and variations are possible in light of the above teachings. It is therefore to be understood that within the scope of the appended claims the present invention can be practiced otherwise than as specifically described herein. Although specific embodiments have been illustrated and described herein, it is obvious to those skilled in the art that many modifications of the present invention may be made without departing from what is intended to be limited solely by the appended claims.

What is claimed is:

1. A hole or electron injection polymer and prepolymer, or a hole or electron transport polymer and prepolymer, which comprises a plurality of conjugated or non-conjugated structures with electronic function and a plurality of connecting structures, wherein the connecting structure is used to connect different conjugated or non-conjugated structures, and the connecting structure comprises any one or any combination of the following group: urethane based group and urea based group.

2. A hole or electron injection polymer and prepolymer, or a hole or electron transport polymer and prepolymer according to claim 1, wherein the structure formula of the conjugated or non-conjugated structure comprises

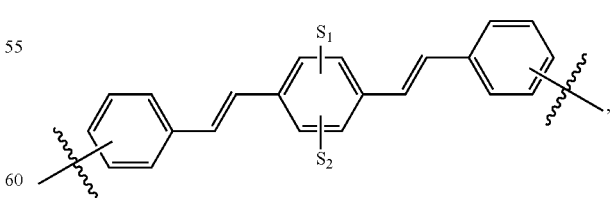

two of the S$^1$, S$^2$ are identical or non-identical, and wherein the S$^1$, S$^2$ comprise one selected from the group consisting of a hydrogen atom, alkyl group, alkoxy group, cyclic alkyl group, aromatic group, heterocyclic group and the combination thereof.

3. A electron injection polymer and prepolymer or an electron transport polymer and prepolymer according to claim 1, wherein the structure formula of the conjugated or non-conjugated structure comprises one selected from the group consisting of
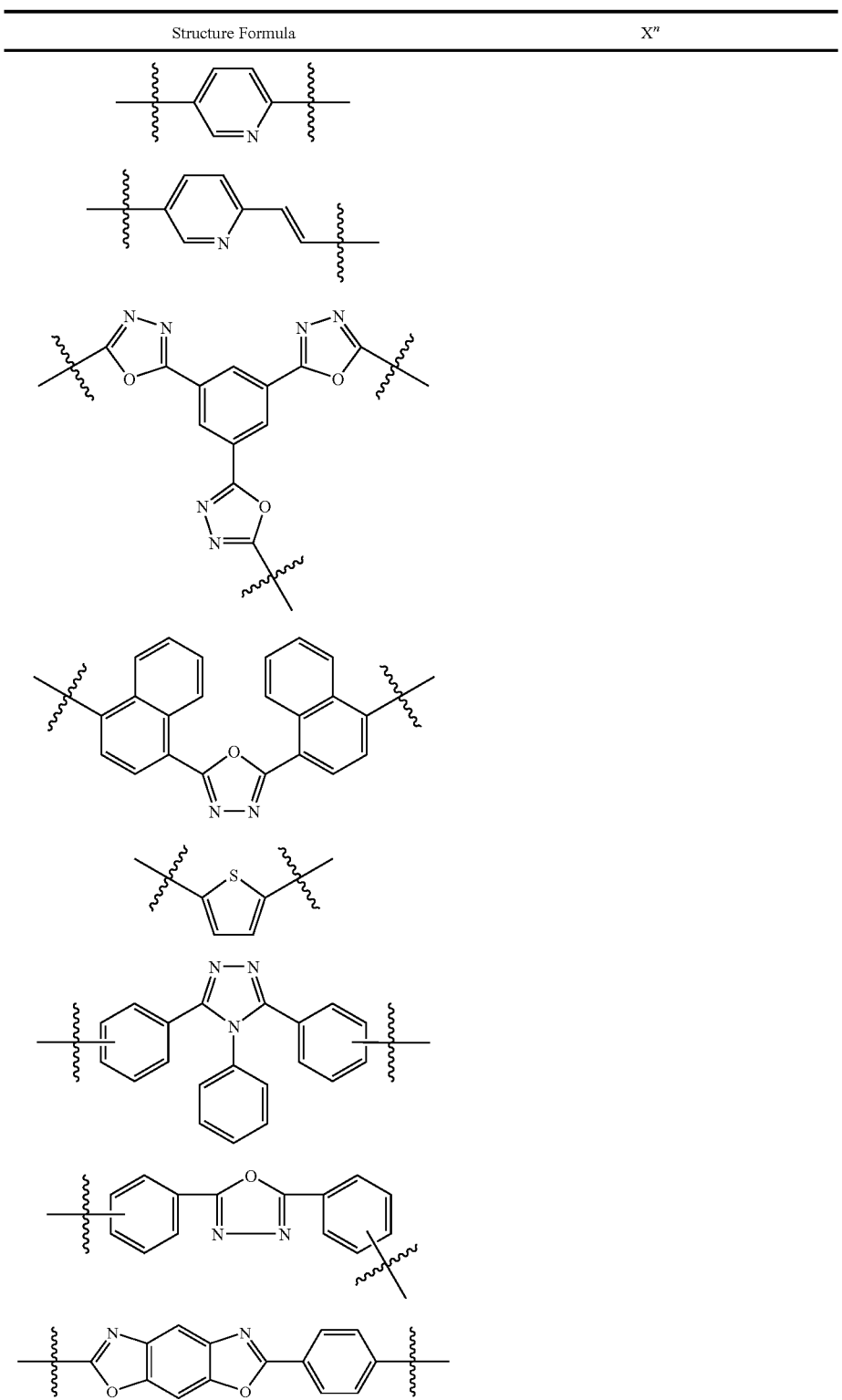

-continued
| Structure Formula | X<sup>n</sup> |
|---|---|
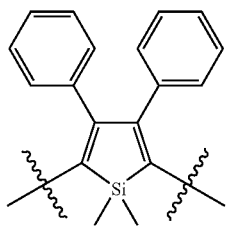
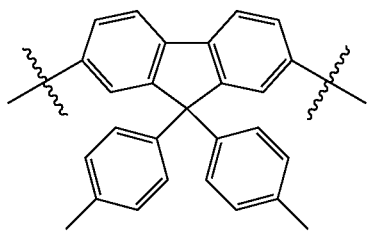
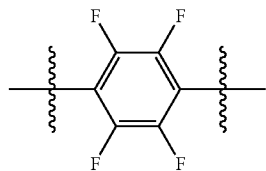
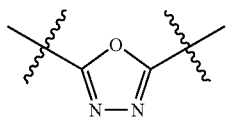
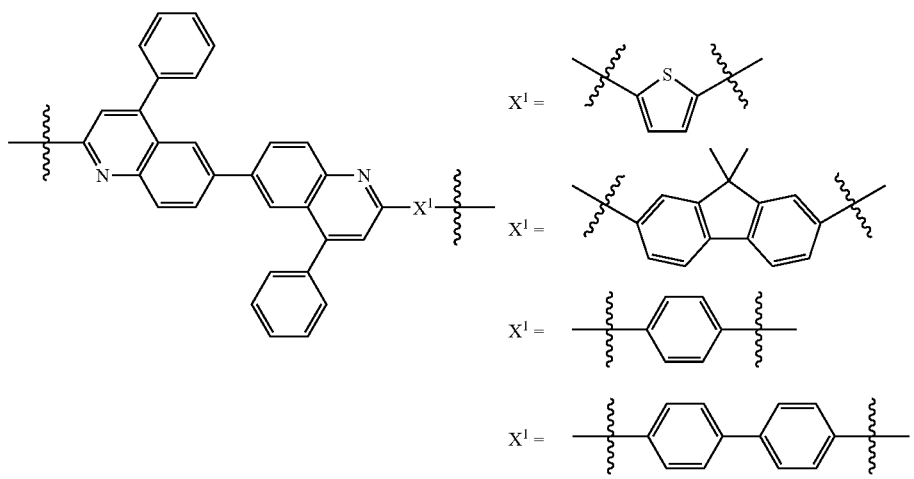

-continued

| Structure Formula | X$^n$ |
|---|---|
| 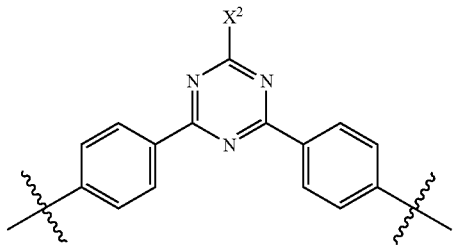 | 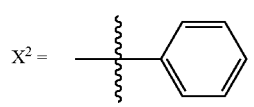 X$^2$ = <br><br> 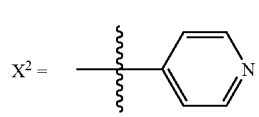 X$^2$ = <br><br> 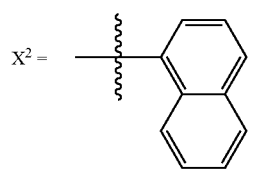 X$^2$ = <br><br> 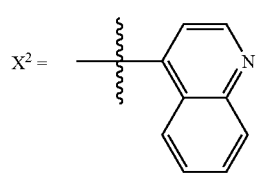 X$^2$ = |
| 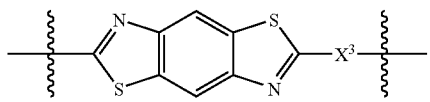 | 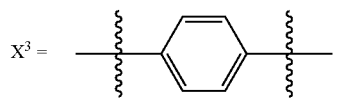 X$^3$ = <br><br> 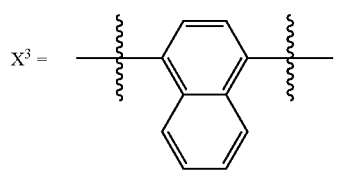 X$^3$ = <br><br> 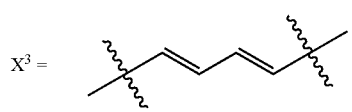 X$^3$ = |

4. A hole or electron injection polymer and prepolymer, or a hole or electron transport polymer and prepolymer according to claim 1, further comprises a plurality of active structures, wherein the connecting structure is used to connect the active structure with the conjugated or non-conjugated structure, and the active structure comprises any one or any combination of the following group: tert-butyl group, carbon-carbon multiple bond, epoxy group, sulfonic group, hydroxyl group, amine group, carboxylic acid group, isocyanate group, organic halide group, acyl halide group and aldehyde group.

5. A hole or electron injection polymer and prepolymer, or a hole or electron transport polymer and prepolymer according to claim 1, wherein the hole or electron injection polymer and prepolymer, or a hole or electron transport polymer and prepolymer are used in hole injection layer or hole transport layer or electron injection layer or electron transport layer of light emitting diodes.

6. A hole or electron injection polymer and prepolymer, or a hole or electron transport polymer and prepolymer according to claim 1, wherein the polymer/prepolymer has the following general equation:

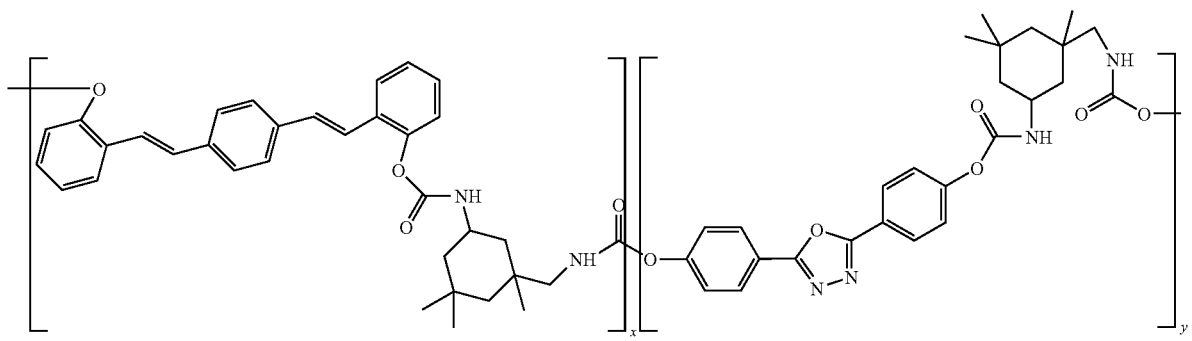
where x and y are integers $0 \leqq x \leqq 10$, $0 \leqq y \leqq 10$ and x, y cannot be zero simultaneously.